United States Patent
Loach (10) Patent No.: US 9,210,238 B2
(45) Date of Patent: *Dec. 8, 2015

(54) METHOD AND SYSTEM FOR NETWORK DATA FLOW MANAGEMENT

(71) Applicant: Sandvine Incorporated ULC, Waterloo (CA)

(72) Inventor: Scot Loach, Waterloo (CA)

(73) Assignee: Sandvine Incorporated ULC, Waterloo (CA)

( * ) Notice: Subject to any disclaimer, the term of this patent is extended or adjusted under 35 U.S.C. 154(b) by 161 days.

This patent is subject to a terminal disclaimer.

(21) Appl. No.: 13/723,428

(22) Filed: Dec. 21, 2012

(65) Prior Publication Data

US 2013/0138827 A1  May 30, 2013

Related U.S. Application Data

(63) Continuation of application No. 12/869,948, filed on Aug. 27, 2010, now Pat. No. 8,364,812.

(51) Int. Cl.
*H04L 29/08* (2006.01)
*H04L 29/06* (2006.01)
(Continued)

(52) U.S. Cl.
CPC ............... *H04L 69/02* (2013.01); *H04L 47/17* (2013.01); *H04L 47/19* (2013.01); *H04L 47/193* (2013.01); *H04L 47/37* (2013.01); *H04L 47/40* (2013.01); *H04L 67/32* (2013.01); *H04L 69/163* (2013.01)

(58) Field of Classification Search
CPC ............................ H04L 67/32; H04L 63/0227

USPC .......................................................... 709/224
See application file for complete search history.

(56) References Cited

U.S. PATENT DOCUMENTS 6,917,614 B1  7/2005  Laubach et al.
6,925,060 B2 *  8/2005  Mangin .................. 370/237
(Continued)

FOREIGN PATENT DOCUMENTS

WO  02/09389  3/2013

OTHER PUBLICATIONS

Forrester Research, Inc., Forrester Research, Inc., "eCommerce Web Site Performance Today—An Updated Look At Consumer Reaction to a Poor Online Shopping Experience" Aug. 17, 2009, Cambridge, MA, USA.
(Continued)

*Primary Examiner* — Asghar Bilgrami
(74) *Attorney, Agent, or Firm* — Gowling Lafleur Henderson LLP; Neil Henderson (57) ABSTRACT

A network data flow management device including: a working packet module configured to store data related to a data flow; at least one network interface connected to the working packet module for receiving and sending data related to data flows; and a processor configured to: receive data from the working packet module and determine if the data flow matches a predetermined protocol; and if the data flow matches the predetermined protocol, send predictive acknowledgments based on the data flow via the network interface. A method for network data flow management including: monitoring a data flow for a predetermined protocol; if the data flow matches the predetermined protocol, saving data relating to the data flow; and creating and sending a predictive acknowledgement packet related to the data flow.

20 Claims, 6 Drawing Sheets

(51) Int. Cl.
*H04L 12/801* (2013.01)
*H04L 12/893* (2013.01)

(56) References Cited

U.S. PATENT DOCUMENTS

| | | | |
|---|---|---|---|
| 7,219,158 B2 | 5/2007 | Border et al. | |
| 2005/0005024 A1 | 1/2005 | Samuels et al. | |
| 2011/0016180 A1* | 1/2011 | Bharadhwaj et al. | 709/205 |
| 2011/0019555 A1 | 1/2011 | Gotoh et al. | |
| 2011/0158186 A1 | 6/2011 | Shihab | |
| 2011/0231564 A1* | 9/2011 | Korsunsky et al. | 709/231 |
| 2011/0299393 A1 | 12/2011 | Almutairi et al. | |

OTHER PUBLICATIONS

Xiaohui Chen et al.; Reducing Web Latency in Mobile Network, Computer and Information Science 2009, 8th IEEE/ACIS International Conference, New Jersey USA, Jun. 1, 2009, pp. 829-833.

European Patent Office, European Search Report for European Patent Application No. 11 17 8982, Berlin Germany, Nov. 25, 2011.

European Patent Office, Examination Report for EP Patent Appln No. 11178982.2, Jan. 11, 2013.

European Patent Office, Examination Report for European Patent Appln. No. 11178982.2, Aug. 23, 2013.

Sherwood, R., et al., "Misbehaving TCP Receivers Can Cause Internet-Wide Congestion Collapse", Proceedings of the 12th ACM Conference on Computer and Communications Security, Alexandria, VA, Nov. 7-11, 2005, New York, NY: ACM, US, vol. CONF. 12, Nov. 7, 2005, pp. 383-392.

Moncaster, T., et al., "A TCP Test to Allow Senders to Identify Receiver Non-Compliance", draft-moncaster-tcpm-rcv-cheat-02.txt, 20071108, No. 2, Nov. 8, 2007, pp. 1-31.

Anil Kumar, V. et al., "On Remote Exploitation of TCP Sender for Low-Rate Flooding Denial-of-Service Attack", IEEE Communications Letters, IEEE Service Center, Piscataway, NJ, US, vol. 13, No. 1, Jan. 1, 2009, pp. 46-48.

Savage, S., et al., "TCP Congestion Control with a Misbehaving Receiver", Computer Communication Review, ACM, New York, NY, US, vol. 29, No. 5, Oct. 1, 1999, pp. 71-78.

European Patent Office, Examination Report on EP Appln. No. 11178982.2, dated Sep. 30, 2014.

\* cited by examiner

METHOD AND SYSTEM FOR NETWORK DATA FLOW MANAGEMENT

CROSS-REFERENCE TO RELATED APPLICATIONS

This application is a Continuation of U.S. application Ser. No. 12/869,948 filed Aug. 27, 2010, which is hereby incorporated herein by reference.

FIELD

The present document relates generally to a system and method designed to improve the quality and speed of network data flow. More particularly, the present document relates to a method and system for network data flow management that influences the load time of data in a network environment.

BACKGROUND

Broadband Internet subscribers have a certain expectation of the quality of their experience using the Internet. For example, with web pages, Internet users have an expectation that pages will load within a 'reasonable' amount of time. What is reasonable varies, but it is generally agreed that the users expect a page to load in under 3 seconds. A recent Akamai™ survey found that 47 percent of consumers expect a load time of less than 2 seconds. In fact, 40 percent of respondents indicated that they would leave a site if it takes longer than 3 seconds to load (FORRESTER RESEARCH, INC., "eCommerce Web Site Performance Today—An Updated Look At Consumer Reaction To A Poor Online Shopping Experience" Aug. 17, 2009, Cambridge, Mass., USA).

Consumers also expect that increasing bandwidth will solve any Internet quality issues, but increased bandwidth alone may not improve page load time, or the load time for gaming or videos.

Consider that the load time for a web page is determined by a combination of:

a) Bandwidth speed and the size of a page;
b) Latency of the network (for example, between the client and DNS server, between the client and web server and the like);
c) Jitter of the network between the client and the server; and
d) 'Think time' of the server and the client, such as memory access, Javascript execution etc.

A typical website may have 10-20 unique transmission control protocol (TCP) connections required to load all of the content such as cookies, advertisements, HTML-content, images, Javascript libraries, etc. Web browsers have tried to address this situation through the parallelization of connections.

All things considered, and making the simplifying assumption that TCP instantly ramps up to the maximum speed of the Internet connection, then a typical webpage may load in something like the load time calculation of:

Load Time=(page size/bandwidth)+[number of DNS lookups*(client-to-DNS server latency+client-to-DNS server jitter)]+[number of serial TCP connections*(client-to-servers latency+client-to-servers jitter)]

Conventional TCP employs a congestion management algorithm called AIMD (additive increase, multiplicative decrease). One of the aspects of this algorithm is referred to as 'slow-start' (Allman, M., Paxon, V., Stevens, W.; RFC 2581, TCP Congestion; Network Working Group, Standards Track; April 1999, http://www.ietf.org/rfc/rfc2581.txt, which is hereby incorporated by reference), which causes TCP to linearly increase in speed until a packet is lost, at which point it slows down and hovers around that rate. If packets are lost due to congestion, then TCP may cut its rate in half each time. The implication for web page loading may be that the many small TCP connections required for each site may never reach full speed, allowing latency and jitter to dominate the Load Time calculation, provided above. The page size and the bandwidth term may become an insignificant part of the calculation.

Therefore, there is a need for an improved system and method to minimize the effect of slow start in order to optimize load time.

SUMMARY

It is therefore desirable to provide a method and system intended to improve Internet load time.

In a first aspect, there is provided a network data flow management device including: a working packet module configured to store data related to a data flow; at least one network interface connected to the working packet module for receiving and sending data related to data flows; and a processor configured to: receive data from the working packet module and determine if the data flow matches a predetermined protocol; and if the data flow matches the predetermined protocol, send predictive acknowledgments based on the data flow via the network interface.

In a particular case, the network data flow management device includes one or more timers are in communication with the processor to allow the processor to determine the timing of the predictive acknowledgments.

In another particular case, the predetermined protocol is one that uses a positive acknowledgment protocol.

In still another particular case, the predetermined protocol is a protocol selected from: Transmission control protocol (TCP); Hypertext transfer protocol (HTTP); Post Office Protocol (POP3); and File Transfer Protocol (FTP).

In a particular case, the predetermined protocol is encrypted using transport layer security (TLS).

In another particular case, the predictive acknowledgments being sent may be based on a client equipment type. In particular, the client equipment type includes a wireless handset.

In yet another particular case, the predictive acknowledgments being sent may be based on at least one client property. In particular, the client property may be one or more of: service plan; location; network access type; browser; and operating system.

In a particular case, the network data flow management device is deployed in a flow path and the at least one network interface is adapted to receive packets from a sender and transmit packets to a receiver.

In another particular case, the network data flow management device is deployed in a client flow path and the at least one network interface is adapted to receive and transmit packets from a single client to multiple servers.

In still another particular case, the network data flow management device is deployed external to the data flow and receives a copy of the data flow diverted through a network device.

In another aspect a method for network data flow management is provided, including: monitoring a data flow for a predetermined protocol; if the data flow matches the predetermined protocol, saving data relating to the data flow; and creating and sending a predictive acknowledgement packet related to the data flow.

In a particular case, determining whether or not to send the predictive acknowledgement packet, wherein the decision to send the predictive acknowledgment packet is based on one or more of: network congestion; history of previous data flow results; round-trip time; type and content of the data flow.

In another case, determining whether or not to send the predictive acknowledgement packet, wherein the decision to send the predictive acknowledgment packet is based on at least one client property. In this case, the at least one client property is based on one or more of: service plan; location; network access type; browser; operating system; and client equipment type.

In some cases, the method include recovering a dropped packet between a server and a network flow management device by terminating a connection between the network flow management device and the client and establishing a new session to the server, re-sending at least one of the predictive acknowledgement packets, and recovering the dropped packet from the response on the new session.

In a particular case, the method includes waiting for a handshake to be complete prior to creating and sending the predictive acknowledgment packet when Transport Layer Security (TLS) is used to encrypt the flow.

In some cases, the method provides for waiting a hold-off time before sending the predictive acknowledgement packet.

In some cases, the predetermined protocol is one that uses a positive acknowledgment protocol.

Other aspects and features of the method and system will become apparent to those ordinarily skilled in the art upon review of the following description of specific embodiments of the systems and methods in conjunction with the accompanying figures.

BRIEF DESCRIPTION OF THE DRAWINGS

Embodiments will now be described, by way of example only, with reference to the attached Figures, wherein.

DETAILED DESCRIPTION

Generally, there is provided methods and systems that are intended to improve load times of network data through predictive acknowledgement in order to optimize load times in various protocols. In particular, this document relates to a network data flow management system and method that use 'predictive acknowledgement' together with network information to speed data load times. The method and system can be applied to network protocols with the following general characteristics:

a) The protocol uses positive acknowledgements: Data sent from one network node (a sending node) to another (a receiving node) must be acknowledged by the receiving node sending an acknowledgement (ACK) message back to the sending node, which may also be referred to as a request/reply protocol.

b) The protocol uses a congestion management algorithm that ramps slowly: Data transfer between network nodes starts at a slow rate and is gradually increased.

The network data flow management system and method are described in the context of a predetermined protocol, and in particular, the TCP protocol. The TCP protocol uses positive acknowledgements and the TCP protocol's congestion management algorithm ramps slowly due to the additive increase/multiplicative-decrease ("AIMD") algorithm. It will be understood that the system and method provided may work with other protocols satisfying the above requirements. Applications protocols such as, hypertext transfer protocol (HTTP), post office protocol (POP3), file transfer protocol (FTP), or other protocol that uses a request and reply protocol over TCP may benefit from the network data flow management system and method provided below. One skilled in the art will appreciate that the methods and systems described below can be applied to protocols that are interactive and use a request/reply model of communicating, such as gaming and video.

Figure 1:
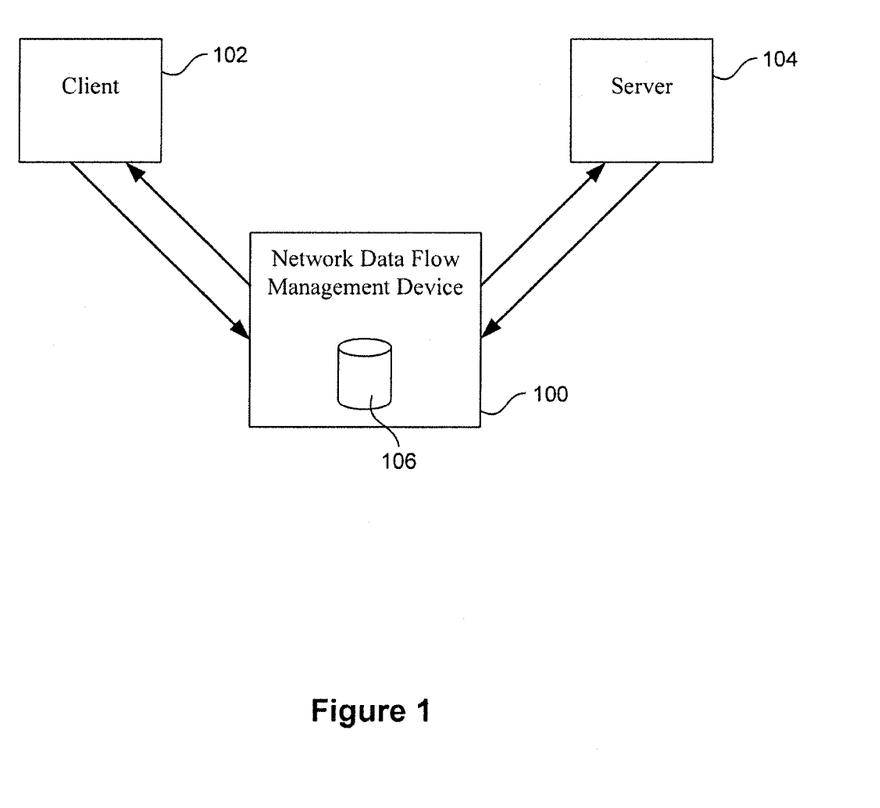
FIG. 1 illustrates, in simplified form, a block diagram of a network set-up.

FIG. 1 illustrates a network data flow management device (100) that may, in fact, be a hardware device or software module. The network data flow device receives and forwards packets between two network hosts. The network data flow management device (100) is sometimes referred to herein as a slow start optimizer or SSO. For the purpose of this example, one host is assigned 'client' (102) and the other host 'server' (104). The client (102) is typically a broadband Internet subscriber, and the server (104) is typically a server computer remotely located on the Internet. In this embodiment, the network data flow management device may be provided in-line and forward packets between the network interfaces. In another embodiment, (not shown), the network data flow management device (100) may receive copies of packets in a data flow from another device that is positioned within the flow. In either embodiment, the network data flow management device is intended to monitor new data flows matching a predetermined protocol such as TCP.

Figure 2:
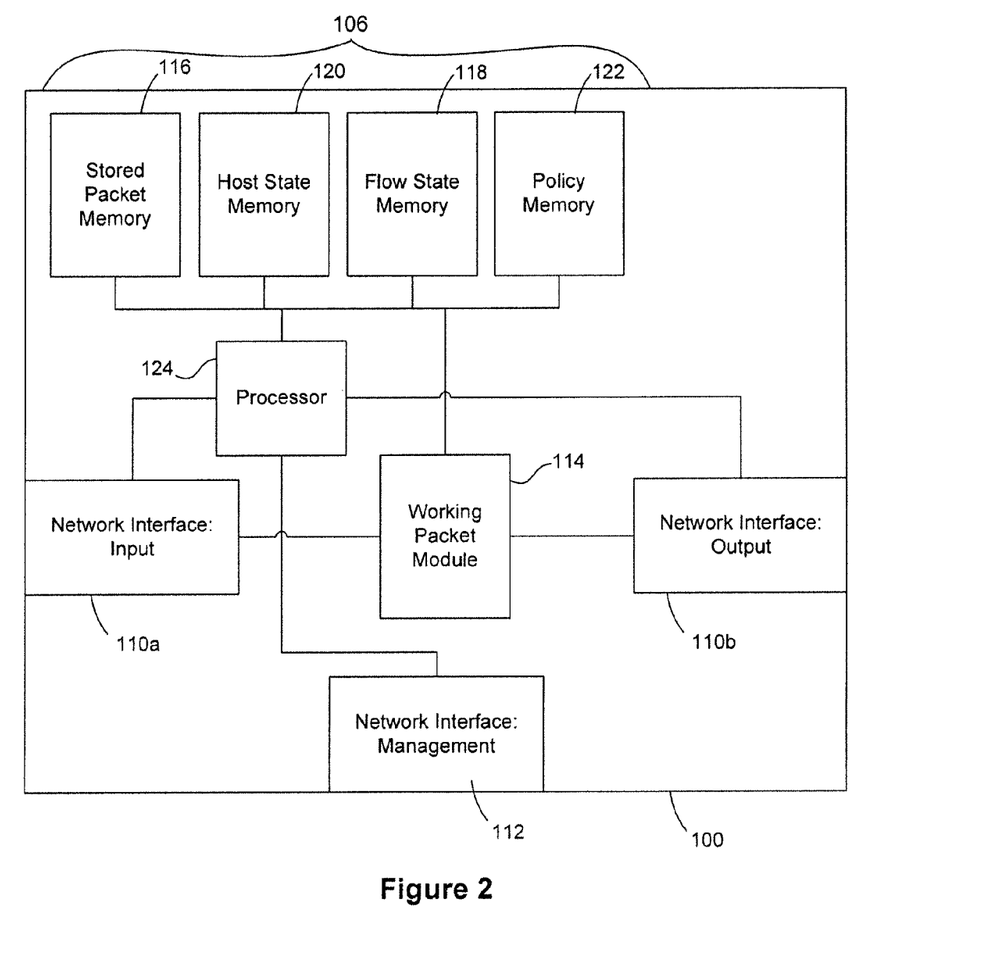
FIG. 2 illustrates the hardware components according to one embodiment.

FIG. 2 illustrates an embodiment of the network data flow management device (100). The network data flow management device (100) has a network interface for data (110), where packets can be received from the network and transmitted to the network. In some cases the network interface for data may include an input (110a) and an output (110b) interface. The network data flow management device (100) may have a further network interface for management (112), used for device configuration and monitoring, policy configuration, and provisioning information about network congestion that will be used to make optimization decisions.

The network data flow management device (100) shown has a working packet module (114) or working packet memory, where packets are stored for processing after they are received by the input interface for data (110a) or before they are transmitted on output network interface for data (110b). When the input network interface for data (110a) receives the packets, the network interface for data (110a) will transmit them into the working packet module (114) for storing. A processor (124), operatively connected with the working packet module (114), will inspect the packets stored within the working packet module (114). The working packet module may be part of a memory (106) within the network data flow management device (100), or may be implemented as a separate component.

The memory (106) of the network data flow management device (100) may further include a stored packet memory (116), a flow state memory (118) a host state memory (120) and a policy memory (122). The stored packet memory (116) may buffer packets for a predetermined amount of time, as part of the optimization method. The stored packet memory (116) may receive the packets to be buffered from the working packet memory (114). Packets stored in the stored packet memory (116) are referenced by flows stored in the flow state memory (118).

The host state memory (120) stores saved states about servers on the network. The host state memory (120) may be indexed by the IP address of a server or by another key designed to act as a unique identifier. The host state memory (120) may hold a plurality of Host Control Blocks. Each Host Control Block (HCB) may store at least some of the following data associated with a network host such as:

The result of each of the last 10 flows to the server, which includes:
  the server response time;
  the server Round Trip Time;
  the estimated potential savings from optimization;
  whether optimization was attempted previously;
  the actual savings from the optimization, if optimization was attempted previously; and
  the number of server packets lost in the network.
It will be understood that results of more or less flows may be stored in each HCB or in a group of HCBs.

The flow state memory (118) maintains a flow state about in-progress flows. For example, the flow state memory (118) may be indexed by the 5-tuple of a flow; that is, the combination of the client IP address, the client TCP port, the server IP address, the server TCP port, and the IP protocol. The flow state memory (118) may also be indexed by other coordinates, such as the 5-tuple in addition to a Multi Protocol Label Switching ("MPLS") tag identifier. The flow state memory (118) may hold a plurality of Flow Control Blocks. Each Flow Control Block (FCB) may store the following data associated with a network host:
  the maximum segment size (MSS) for the flow;
  the current state of the flow,
  the TCP window scale for the client and server;
  the next sequence number for the client and server;
  the receive window of the client;
  the timestamp of when the SYN packet was received;
  the timestamp of when the SYN-ACK packet was received;
  the server Round Trip Time (RTT);
  the client Round Trip Time (RTT);
  the Server Response Time (SRT);
  the result of the optimization decision (true or false);
  a copy of the request sent by the client; and
  a list of descriptors for packets from the server. Each descriptor is composed of the following data:
    TCP Sequence number;
    TCP segment length;
    pointer into packet data memory where the packet is stored; and;
    whether the client has acknowledged the data.

The policy memory (122) may store configurations determining what flows are optimized and the behavior of the optimization. The policy memory (122) may store the following configuration, which may be provided by an outside source:

congestion notification for clients affected by congestion on the access network;
the minimum round-trip time of a flow required to consider the flow for optimization;
properties of the client (104) such as service plan, pre-paid or post-paid, location, network access type, web browser, operating system;
client equipment type, for example the client equipment maybe be a mobile communication device or a wireless handset;
application-specific policy that may affect optimization; for example, access devices or operating systems that should or should not have optimization applied;
rules to control which flows may be optimized or not optimized, based on IP or TCP packet headers and the payload of the request, rules may be specified as a sequence, where the first rule in the sequence may be matched or applied to the flow; and
the base hold-off time for sending the predictive acknowledgements.

Figure 4:
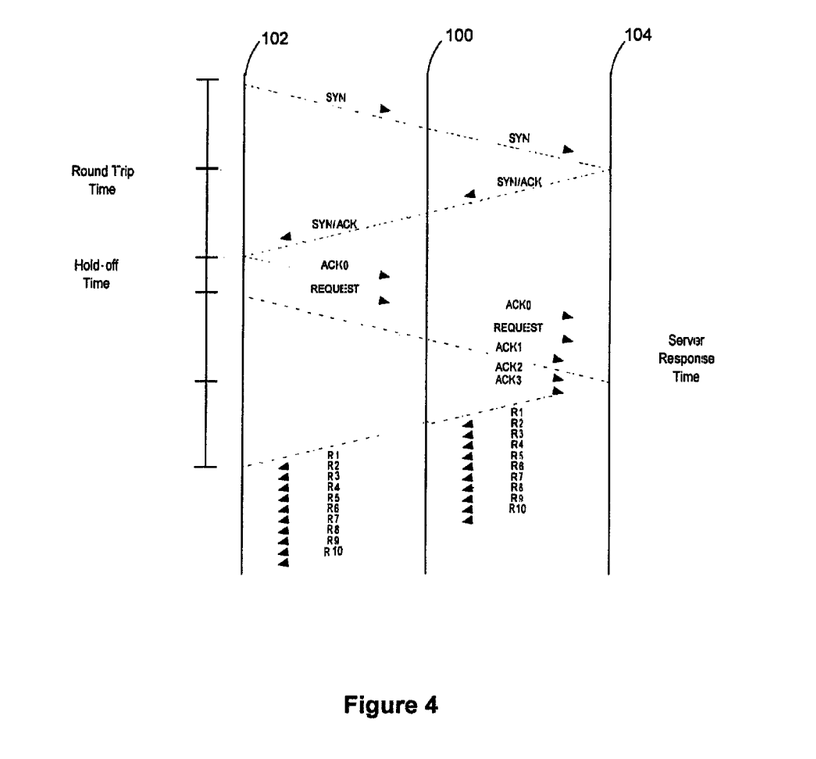
FIG. 4 illustrates a TCP flow with the addition of the network data flow management device.
Figure 5:
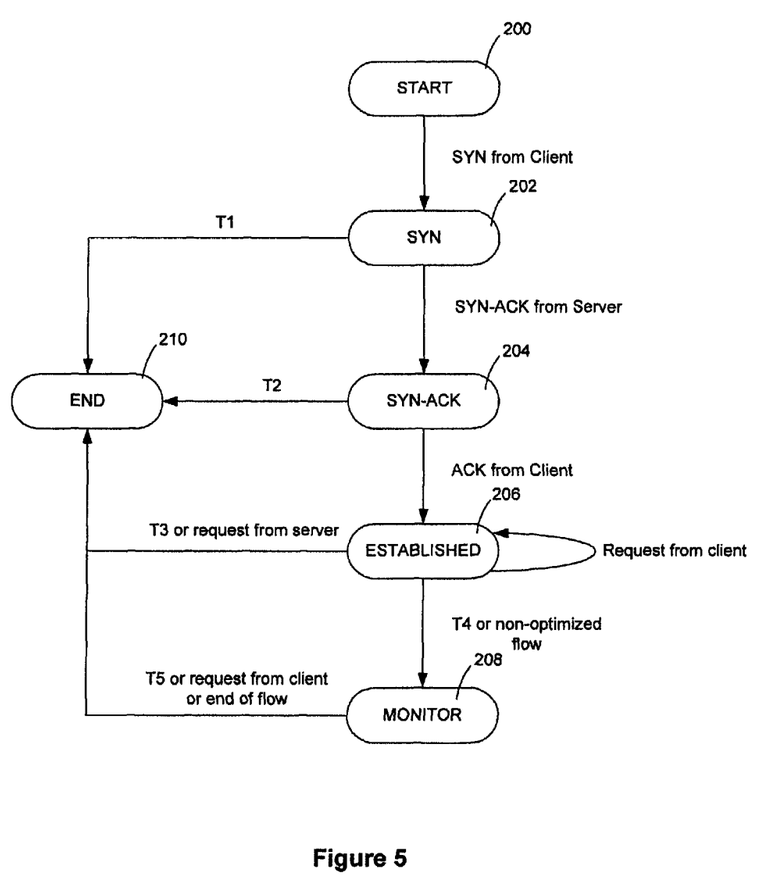
FIG. 5 illustrates a flow chart of the method for the network data flow management device according to one embodiment.

The processor (124) or controller is included to implement the network data flow management method including implementing and running a packet monitor and one or more timers, described below. The network data flow management method may be applied independently to each data flow that is inspected. FIGS. 4 and 5 illustrate the network data flow management method, with FIG. 5 using a Finite State Machine (FSM) representation. State transitions may be driven by packets being inspected by the packet monitor and by one or more timers implemented and run by the processor (124) of the network data flow management device (100).

Figure 3:
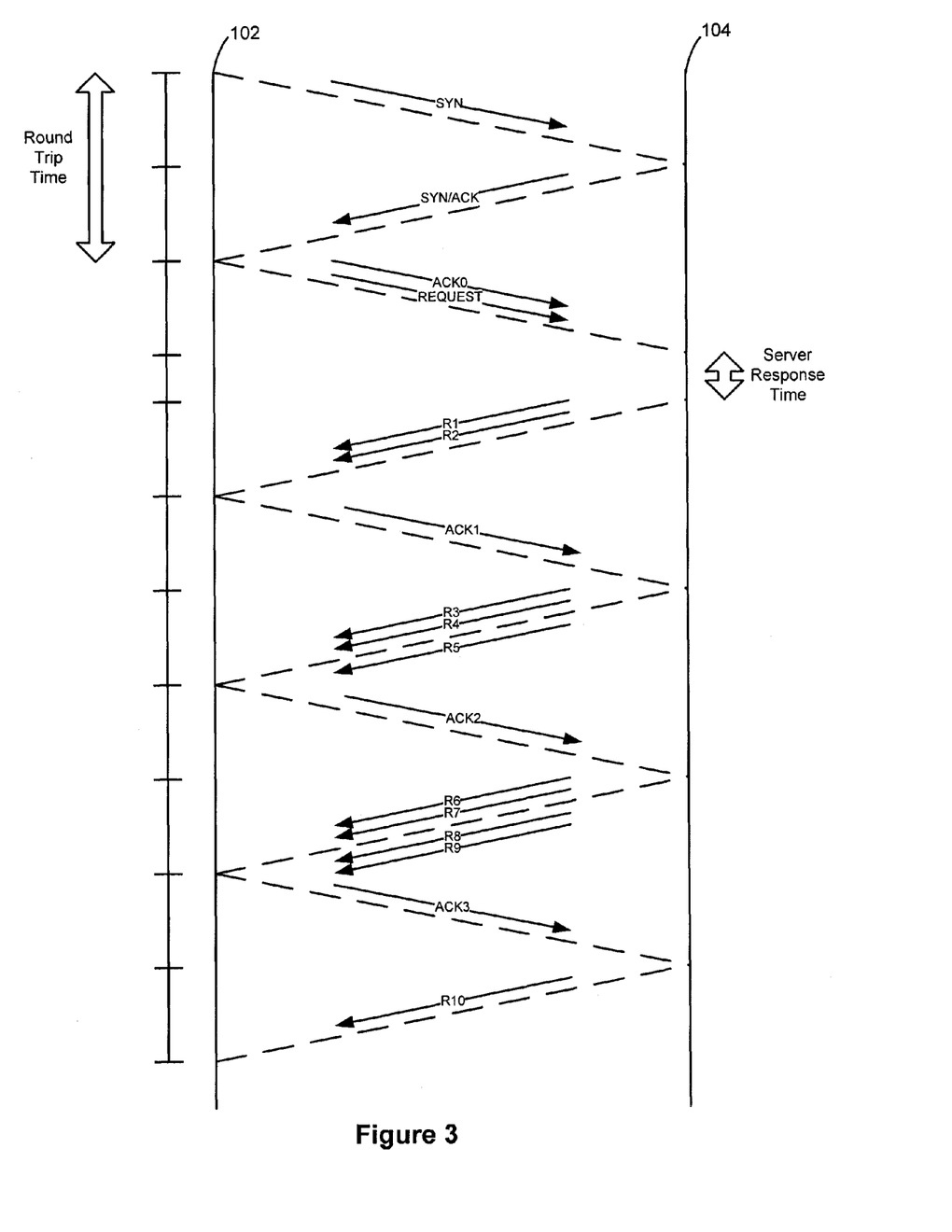
FIG. 3 illustrates a conventional TCP flow.

Before moving to the network data flow management method shown in FIGS. 4 and 5, FIG. 3 illustrates a conventional TCP connection asking a slow start. Typically, the client node (102) initiates a connection by sending a SYN segment to the server (104). The server (104) responds with a SYN/ACK segment. The time between the client (102) sending the SYN segment and receiving the SYN/ACK segment is referred to as the round trip time for the connection.

Upon receiving the SYN/ACK segment, the client (102) completes the connection by sending an ACK segment, and sends a request in the next segment. When the server (104) receives the request it will process the request. This server processing may take some time and this time is referred to as 'server response time' (SRT). When the server (104) has finished processing the request, the server prepares and sends a response to the client (102). The response may be divided into TCP segments for transmission over the network.

The remainder of the transmissions in FIG. 3 shows how conventional TCP slow start works. The server (104) starts by sending two segments to the client (102), and then the server (104) waits for an ACK segment from the client (102). When the client (102) receives the response segments, it sends an ACK to the server (104). When the server (104) receives the ACK segment, it sends the next three response segments to the client (102). This pattern may continue, with the server (104) increasing the number of response segments it sends each time by one. This process is the 'additive increase' of the AIMD algorithm. The number of response bytes that can be sent concurrently is called the 'congestion window'.

Once the server (104) has finished sending the response, the connection may stay open for another request, or it may be closed. In this example, the response sent by the server was divided into 10 TCP segments. Due to the effect of slow start, the total time to receive the requested data is approximately 5*RTT+SRT. By way of example, if there is 100 ms of latency on the Internet path between the client and the server, then the RTT will be 200 ms and this operation would take over a second to complete.

One way to improve the load time of web pages may be to reduce the time added by TCP slow start. One way this has been addressed is with a 'Performance Enhancing Proxy' (Border, J., Kojo, M., Griner, J., Montenegro, G., Shelby, Z., RFC 3135-Performance Enhancing Proxies Intended to Mitigate Link-Related Degradations, Network Working Group, Informational, June 2001, http://www.ietf.org/rfc/rfc3135.txt, which is hereby incorporated by reference). The PEP is intended to improve performance over a slow access link. TCP slow start is addressed by a technique called 'Local TCP acknowledgements'. This technique places a PEP on the Internet side of a slow access link, such as a satellite link. The PEP acknowledges traffic and data from a web server after the data has been received by the PEP. This technique may allow TCP's slow start phase to ramp much more quickly, as the latency of the slow link may be removed from the equation. The local TCP acknowledgement technique may mitigate the effect of a slow access link on web page load time. However, this solution does not address the effects of high latency between an Internet service provider's (ISP) autonomous system and a web server somewhere else on the Internet. In this case, the ISP cannot put a PEP closer to the web server and use local acknowledgements, since the ISP does not control the network outside of its domain.

Using this technique, the PEP acknowledges data the PEP has received from the server on behalf of the client. This PEP approach is unlike the predictive acknowledgement technique described herein. In the present embodiments, the network data flow management device (100) acknowledges data in advance of receipt by either the client or the network data management device (100), that is, the network data flow management device (100) predicts the receipt of the data and acknowledges in advance of receipt.

FIG. 4 shows a similar flow to that of FIG. 3 but with the network data flow management device (100) applied to it. The client node (102) initiates the connection by sending a SYN segment to the server. When the network data flow management device (100) receives this request from a client (102) over a new data flow matching a predetermined protocol, the network data flow management device (100) makes a decision on whether or not to optimize the flow. Decisions may be based on attributes of the flow or the request, data saved in memory (106), and information known to external systems.

The network data flow management device (100) receives this packet and forwards it to the server (104). The server (104) responds with a SYN/ACK segment. The network data flow management device (100) receives this packet and forwards the packet to the client (102). Upon receiving the SYN/ACK segment, the client (102) completes the connection by sending an ACK segment, and sends a request in the next segment. The network data flow management device (100) receives these packets and forwards them to the server (104).

To alter or counteract the slow-start algorithm, the network data flow management device (100) is configured to send ACK packets to the server on behalf of the client (102). The ACK packets is sent in a predictive manner, meaning that the network data flow management device (100) sends the ACK packet to the server (104) prior to either the client (102) or the network data flow management device (100) receiving the data that the ACK packet is acknowledging. For this predictive acknowledgement technique to work, the server (104) may need to send a response packet before the server (104) receives the acknowledgement for the packet from the client (104). Therefore the network data flow management device (100) may wait for a 'hold-off time' before sending the first predictive acknowledgement. This hold-off time starts out at some predetermined value, and may be updated based on server response times observed and recorded by the network data flow management device (100). Preferably, the hold-off time may be slightly higher than the server response time in order for the response segments to be acknowledged almost immediately after they are sent. The network data flow management device (100) may need to wait a hold-off time prior to sending the first predictive acknowledgment but may not need to wait a hold-off time prior to sending any further acknowledgment to the server (104).

After the network data flow management device (100) has waited for the hold-off time (HT), it then sends TCP ACK segments, or in some cases, several TCP ACK segments for response segments the server (104) will send. The server (104) sends the first two response segments and waits for an ACK. Since the server (104) almost immediately receives the ACK, the server (104) sends the next three response segments and again waits for an ACK. In a similar way, the server (104) almost immediately receives the subsequent ACK and the server (104) sends the next four response segments. The server (104) almost immediately receives the next ACK, and sends the final response segment. The process works in a similar way for any appropriate number of response segments, up to the size of the receive window of the client (102). This process is intended to proceed without waiting for any additional round trips.

In this example, as shown in FIG. 4, the TCP flow can be improved using the network data flow management method and the predictive acknowledgement technique. The total time to receive the requested data may be reduced to approximately 2*RTT+HT. If the hold-off time is similar to the server response time, this process is intended to achieve a savings of almost 3*RTT. By way of example, if there is 100 ms of latency on the Internet path between the client and server, then the RTT will be 200 ms and the operation will take 400 ms plus the hold-off time to complete, for a savings of about 600 ms, or 60%, over the conventional method illustrated in FIG. 3.

The network data flow management device (100) may make the decision to optimize a flow based on network congestion. For example, if explicit congestion notification (ECN) is used for the flow, network congestion can be extracted from the Internet protocol (IP) and TCP headers of the packets in the flow. Congestion on the access network can be inferred by keeping track of the round-trip time between the SYN-ACK packet from the server (104) and the ACK response from the client (102), and looking for flows that have an unusually high round-trip time or access round trip time (aRTT).

Another way to learn about network congestion may be to obtain it from a third-party system, by requesting the network congestion from the third party system or by having the third party system provision the information into the network data flow management device (100). For example, Simple Network Management Protocol (SNMP) queries to an access router may be used to map each client IP address to a physical link, and to query the link capacity and utilization, which can be used to calculate the congestion of the link that a client is on. Once the network data flow management device (100) learns about network congestion, the network data flow management device (100) can be configured to only optimize data flows when the network is not congested. By doing this, the slow-start congestion avoidance algorithm of TCP, for example, may be replaced by the network data flow management method provided below, which is intended to be more efficient.

The decision to optimize a data flow can further be based on history stored in memory (106). For example, if optimizations of requests to a particular server (104) have been attempted in the past, with poor results such as dropped packets or a negligible improvement in load time, then future requests to that server (104) may not be optimized. In a particular case, every ten requests of a server may be tested after the server has been determined to have poor results. If the new results have been found to be a good level, the previously stored poor results may be removed from the memory and future requests from the server may be optimized. It will be understood that the number of results and frequency of requests may increase or decreased depending on parameters set in the network data flow management device (100). Another approach may be to inspect traffic without optimizing, or engaging the method for network data flow management the first time traffic to a server is seen by the network data flow management device (100). After a predetermined number of flows to the server have been determined to be good candidates for optimization, future flows to that server can have the method for network data flow management applied to them.

In addition or in the alternative, the decision to optimize a flow can be based on round trip time between clients and a server. The network data flow management device (100) may measure the round trip time as it inspects packets between the client (102) and the server (104). If the round-trip time is less than some pre-determined threshold, then the improvement from the optimization will be marginal and the request may not be optimized. By way of example, if the round-trip time of a web page is less than 10 ms, then the improvement is unlikely to be noticeable to a user.

Still further, the decision to optimize a flow can be based in addition or alternatively, on the type or content of the request from the client to the server. Requests that are idempotent, in other words, requests that can be repeated and may have no further effect on outcome, such as a HTTP GET request, can be generally safely optimized. Requests such as a HTTP POST request can generally not be optimized, as any data loss during the optimization may be unrecoverable.

If the flow will not be optimized, subsequent packets in the flow may not need to be inspected. If the network data flow management device (100) decides to optimize the flow, the network data flow management device (100) may employ the network data flow management method described below. This method, inclusive with 'predictive acknowledgement' is intended to quickly ramp the data flow that matches a predetermined protocol, through its slow-start phase, regardless of the latency on any part of the path between the client and server.

The network data flow management device (100) may use the variables described above alone or in combination to make an optimization decision. Having given these general examples, those skilled in the art will appreciate that other appropriate variables may also be used to decide whether or not to optimize a request.

The network data flow management device (100) may be deployed in a network at any point where the network data flow management device (100) can monitor traffic between a client and the Internet. The network data flow management device (100) may be deployed on one of the endpoints or between the endpoints in the network. Preferably, the network data flow management device (100) receives all packets for sessions desired to be optimized. For example, to optimize most web traffic, TCP packets with source or destination port 80 should be forwarded to the network data flow management device. The network data flow management device (100) may not be required to be in-line, but may be more effective, if the packets are received in near real-time.

FIG. 5 illustrates the network data flow management method in state machine format in relation to TCP packets. The state machine for a flow, sometimes referred to as traffic, is started (200) when a new SYN packet is received (202) by the network data flow management device (100) via the network interface for data (110). It will be understood, that when the flow is received by the network interface for data (110) it will be transmitted to the working packet module (114) and be checked by the packet monitor of the processor (124) to determine if the flow matches a predetermined protocol such as TCP, HTTP or other positive acknowledgement protocol. A new Flow Control Block (FCB) may be allocated in the flow state memory (118). The FCB is populated with the time when the SYN packet was received, the maximum segment size (MSS) and window scale options from the SYN packet, and the current state for the flow, which, at this point, is the SYN state. The next sequence number for the client (102) is updated to the sequence number in the SYN packet+1. A timer T1, which may be set by the processor (124), will timeout the flow if no more packets are seen. The timeout frees the flow state memory (118).

If a SYN-ACK packet is received (204) for a flow in the SYN state, the flow transitions to the SYN-ACK state. The related Flow Control Block is retrieved and updated by setting the FCB state to the SYN-ACK state. The MSS may also be updated to be the minimum of the saved MSS and the MSS sent by the server (104) in the SYN-ACK packet. The server RTT is calculated as the difference between the stored timestamp of the SYN packet and the timestamp of the SYN-ACK packet. The timestamp of the SYN-ACK packet being received is stored. A window scale option sent by the server (104) may also be stored, which may be used in order to determine window size. The next sequence number for the server (104) is updated to the sequence number in the SYN-ACK packet+1. A timer T2 may be set, which will timeout the flow if no more packets are seen, and move to the END state (210) to free the flow state memory (118).

If an ACK packet is received for a flow in the SYN-ACK state, the flow transitions to the ESTABLISHED state (206). The access RTT can be calculated as the difference between the stored timestamp of the SYN-ACK packet and the timestamp of the ACK packet. The TCP receive window of the client (102) is calculated by the processor (124) by multiplying the window field of the packet by 2 to the power of the window scale option saved from the SYN packet, if both the client (102) and server (104) sent a window scale option. The new state, the access RTT, and the receive window size may be stored in the FCB. A timer T3 may be set, which will timeout the flow if no more packets are seen and move to the END state (210) to free the flow state memory (118).

The initial request from the client (102) may be included with the ACK packet, or the request may come in the next packet sent from the client (102). If the next packet is instead from the server (104), the flow state memory (118) is freed because the flow will not be optimized in a situation that does not follow the pattern of a request from the client (102). In either case, the next sequence number for the client (102) may be incremented by the TCP segment size of the packet. The request from the client (102) is saved in the FCB of the flow state memory (118). As noted above, receiving the request from the client (102) may trigger the optimization decision for the network data flow management device (100) method.

The optimization decision may be performed by comparing attributes of the flow against user-defined configuration and saved state or the like, as illustrated in the examples in the following paragraphs.

First, the policy rules saved in the policy memory (122) may be executed against the request. This action may involve the processor (124) checking each rule stored in the policy memory (122) against the packet headers and payload of the request, in sequence. The first rule matching the request packet may stop the search. If the rule's action is to optimize the flow, the decision process continues. If the rule's action is not to optimize the flow, then the flow moves into the END state (210), and the flow state memory (118) is cleared.

The policy memory (122) may also be checked against learned or provisioned attributes of a client (102). For example, the network data flow management device (100) may learn the operating system, device or handset of the client (102) by inspecting HTTP traffic. There may be policy to optimize clients with certain of these attributes differently. For example, a certain operating system may use a different congestion control algorithm in its TCP stack that may not react as well to the predictive acknowledgement technique used by the network data flow management device (100). Policy rules stored in the policy memory (122) may prevent the method for network data flow management from being applied to clients with this operating system.

Next, the access network of the client (102) may be checked for congestion. In this embodiment, network congestion may be provisioned by an outside agent through the network management interface (112). This provisioning information can be stored in policy memory (122) as a simple indication of congestion for any client IP addresses that are experiencing congestion. The decision process checks whether the client IP of the flow has been marked as congested. If client IP of the flow has been marked as congested, the optimization is typically not attempted for the flow. In this case the flow moves to a MONITOR state (208) and the FCB is updated with the new state and the decision not to optimize the flow.

Next, the state of the server (104) may be checked. The HCB is retrieved from the host state memory (120) by looking up the server IP address of the flow. The HCB may keep track of the results of the last 10 flows to the server (104). Alternatively, more or less flows may be stored. If any of the stored results indicate packet loss, the optimization may not be applied and the flow will move to the MONITOR state (208). The FCB is updated with the new state and the decision not to optimize the flow. If none of the stored results indicate any measured improvement as a result of the optimization, the optimization may not be applied and the flow will move to the MONITOR state (208). The FCB is updated with the new state and the decision not to optimize the flow.

Next, the round-trip time of the flow may be checked. This time is the sum of the access RTT and the server RTT. If this sum is less than the minimum round-trip time stored in the policy memory (122), the flow will typically move to the MONITOR state (208) and the FCB is updated with the new state and the decision not to optimize the flow.

If the decision is made to optimize the flow, the FCB is updated with the new state and the decision to optimize the flow. The HCB of the host state memory (120) may be consulted, and if there are any past flows recorded there, the hold-off time is set to the maximum SRT from the HCB record plus the server RTT for the flow. Otherwise, the hold-off time may be set to the default value stored in policy memory (122). A timer T4 is set to trigger the optimization. After this, the flow stays in the ESTABLISHED state (206), and consumes any additional request segments by increasing the next sequence number for the client (102) by the TCP segment size of the packet and appending the request segments to the request data stored in the FCB.

If the T4 timer triggers, by way of a countdown time, the network data flow management device (100) sends predictive acknowledgements to the server on behalf of the client (102) via the network interface for data (110). Each predictive acknowledgement may be sent by creating a new TCP ACK packet in the working packet module (114), and populating it with the source IP and port of the client (102) and the destination IP and port of the server (104) for the flow to be optimized. The sequence number of the packet is set to the next sequence number for the client (102), and the acknowledgement is set to the next sequence number of the server (104), plus the MSS of the flow times the number of the packet being acknowledged. The packets are sent to the server (104) in sequence, with a small gap of, for example, approximately 1 ms between them to avoid the case where the server (104) receives an ACK before the server (104) sends the data. Longer or shorter gaps are contemplated and may be used based on the SRT predictive acknowledgements sent for the entire receive window of the client, since the only impact of sending packets beyond the response payload may be that the server will ignore the extra ACKs.

After the predictive ACKs have been sent, the flow transitions to the MONITOR state (208). This state may be responsible for inspecting the flow, evaluating the success of the optimization, and detecting dropped packets. A timer T5 is set, which will timeout the flow if no more packets are seen, to free the flow state memory (118). This timer may be reset every time a packet is received for the flow; and may trigger the transition to END state (210) if the flow is idle for a predetermined period of time.

The first TCP segment from the server (104) may be used to calculate the SRT for the flow. This value is calculated by subtracting the timestamp of the request from the client (102) from the timestamp of the response packet from the server, and subtracting the server RTT from this value. The SRT may be stored in the FCB of the flow state memory (118). If the flow is being optimized and the SRT is greater than the hold-off time for the flow, the optimization was not successful, since the server (104) would have received the predictive acknowledgement before the server (104) sent the response. In this case, the FCB may be updated to a non-optimized flow, and continue to monitor the flow.

When a packet is received from the server (104) for a flow in the MONITOR state (208), the packet's payload may be inspected. If it contains a TCP segment with data, then the FCB is updated with the starting sequence number and the length of the segment. If the flow is being optimized, then the packet is copied to the stored packet memory (116), and the FCB is updated with a pointer to that stored packet memory (116) entry.

When a packet is received from the client (102) for a flow in the MONITOR state, it is inspected. If the packet contains data, it may be treated as a second request from the client (102); in this case, the optimization may be finished, since the initial response from the server (104) has been returned. If the packet does not contain data, the ACK field is read from the TCP header. The list of packet descriptors in the FCB is searched for all packets where the saved sequence number+ the length of the packet are less than the ACK in the header. Each of these descriptors may be marked acknowledged. If the last descriptor was already marked acknowledged, this is a duplicate ACK from the client (102), which is an indication that the client (102) did not receive the TCP segment from the server (104) starting with the sequence number in the ACK. This situation may indicate that a TCP segment was lost in transit, either between the server (104) and the network data flow management device (100) or between the network data flow management device (100) and the client (102).

If the lost segment is described by a packet descriptor in the FCB, the network data flow management device (100) received the packet but the client (102) did not. Since the network data flow management device (100) has already acknowledged the packet, the server (104) may not be able to retransmit the packet to the client (102). Therefore, the network data flow management device (100) may send the saved packet by copying it from stored packet memory (116) to working packet module (114) and transmitting the packet to the client (102).

If the lost segment is not described by a packet descriptor in the FCB, the network data flow management device (100) has not received the packet. This situation may mean the packet was lost in transit between the server (104) and the network data flow management device (100). Since the network data flow management device (100) has already acknowledged the packet, the server (104) may not be able to retransmit the packet to the client (102). The network data flow management device (100) may recover the packet by opening a new TCP flow to the server (104) and sending the request from the client (102), which is stored in the FCB of the flow state memory (118). When the network data flow management device (100) receives the response, the network flow management device (100) may extract the missing segment from the flow. The network flow management device (100) may saves the recovered segment in the FCB, and creates a new TCP packet on the original flow with the missing segment data.

It will be further that if some data from the server (104) is not acknowledged due to an ACK being lost prior to being received by the server (104), the server (104) will retransmit the data.

In one embodiment, the network data flow management device (100) may depend on the optimized flow being idempotent. In another embodiment, the network data flow management device (100) may handle a permanently lost packet in other ways, such as by closing the connection and letting the client (102) re-post the request.

If a TCP FIN or RST packet is received for a flow in the MONITOR state (208), if the flow times out due to the T5 timer, or if a second client request was received, results may be calculated for the flow. The potential optimization for the flow is estimated with the following algorithm: set a counter to 2, and increment the counter by its current value plus 1 until the counter is greater than or equal to the number of packets sent in the response from the server. Each time the counter is incremented is one round-trip time; the total of the round-trip times counted is the potential time savings for the flow. For optimized flows, this is compared to the actual time taken to receive the response to evaluate the effectiveness of the optimization.

Finally, the HCB for the server (104) may be updated with the results of the flow. A new flow record may be created in the HCB. The server response time and server round-trip time are copied to the new HCB from the FCB. The estimated potential savings is stored, along with whether the optimization was attempted. If optimization was attempted, the achieved savings from optimization is stored. The number of lost packets from the server is also recorded.

Once the network data flow management device (100) has finished with the flow and the HCB has been updated, the FCB is freed to clean up flow state memory (118).

Figure 6:
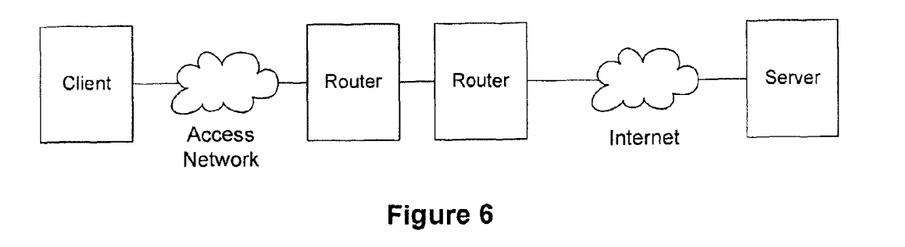
FIG. 6 is a block diagram of a conventional network.

The network data flow management device (100) may be placed in a network; anywhere that the network data flow management device (100) can inspect traffic between a client and a server on the network. FIG. 6 illustrates an example of a conventional network configuration. Traffic sent from the client first traverses an access network, and then is routed through a series of routers to the Internet, where it is routed to the server. Traffic from the server to the client takes the reverse path. One skilled in the art will appreciate that other network designs may be used.

Figure 7:
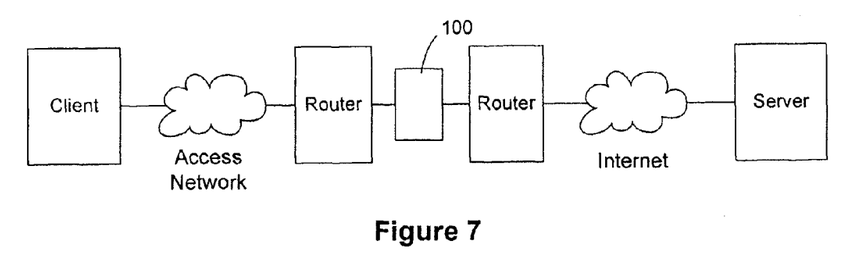
FIG. 7 illustrates in block diagram form, one embodiment of the network system with the network data flow management device in-line.

In one embodiment, the network data flow management device (100) may be placed between two routers, and the network data flow management device (100) may inspect and forward all network packets, as illustrated in FIG. 7. In this embodiment, the network data flow management device (100) may receive network packets between many clients and servers on one network interface for data (110*a*), inspect them, and may forward them out another network interface for data (110*b*). The network data flow management device (100) sends predictive acknowledgements for flows that meet the criteria for optimization.

Figure 8:
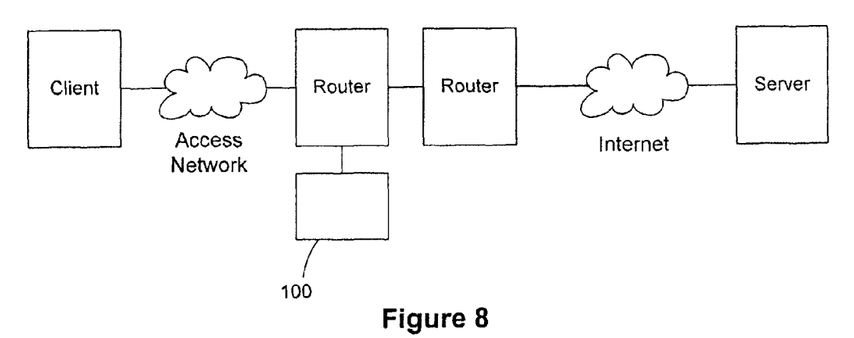
FIG. 8 illustrates another embodiment of the network system with the network data flow management device out of line.

In another embodiment, the network data flow management device (100) may be attached to a router, as shown in FIG. 8, or other network device, for example a switch, and packets are forwarded to the network data flow management device (100) from the network device. The network data flow management device receives packets between many clients and servers on a single network interface for data (110) and inspects the packets, but may not forward the packets. In this embodiment, the network data flow management device (100) may be offline, i.e. not in the flow of traffic, and would not forward the copies of the packets the network data flow management device (100) receives. The network data flow management device (100) sends predictive acknowledgements to the server (104) for flows that meet the criteria for optimization but the server (104) may send the response segments directly to the client (102).

Figure 9:
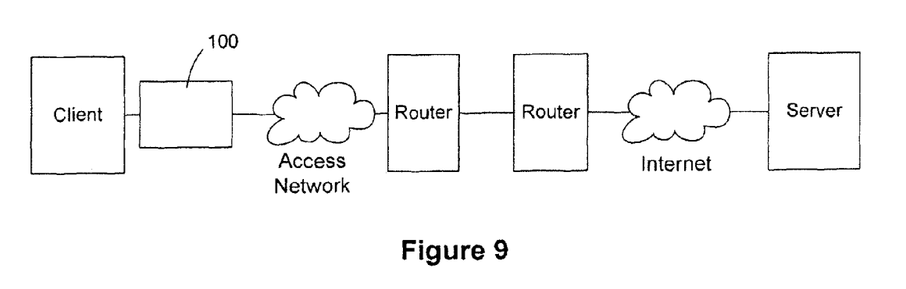
FIG. 9 illustrates another alternative with the slow start inline with user's premises.

In another embodiment, the network data flow management device (100) is placed on the client side of the access network, and the network data flow management device (100) may inspect and forward all network packets, as shown in FIG. 9. In this embodiment, the network data flow management device (100) may receive packets between one client and all servers on one network interface for data (110), inspects them, and forwards them out the opposite interface. The network data flow management device (100) sends predictive acknowledgements for flows that meet the criteria for optimization.

This network data flow management device (100) is intended to improve data load times and, in particular, web page load times, when the round-trip time between the client and the server is high. However, one skilled in the art will appreciate that other benefits are possible. One such benefit is a reduction in upstream ACK packets on the access network: since a client receives more packets in a shorter time, the client will acknowledge a larger set of packets at a time, since most clients will delay sending an ACK until some time has passed, and once that tie has passed, the client may send one ACK for the entire range of data it has received. As a result, fewer ACK packets will be sent upstream from the client.

In this embodiment, the network data flow management system, with the corresponding method, inspects protocols that use a simple request-response model. However, the network data flow management system and method are not limited to such protocols. For example, Transport Layer Security (TLS), used in example in hypertext transfer protocol secure (HTTPS), has a handshake phase before the client sends the request. The network data flow management system and method could be used for TLS encrypted traffic by recognizing the flow as a TLS flow, and waiting until the TLS handshake is complete before entering the ESTABLISHED state.

In one embodiment, the network data flow management system and method inspect application protocols that use TCP as a transport protocol, and performs optimizations based on inspection of the application-level details of the request. This would be effective with application protocols such as HTTP, POP3, and FTP, and any other protocol that uses a request/reply protocol over TCP.

Although the preceding examples use web page loading, one skilled in the art will appreciate that the methods and systems described below can be applied to protocols, typically over the Internet, that are interactive and use a request/reply model of communicating, such as gaming and video.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A network data flow management device comprising:
   a working packet module configured to store data related to a data flow;
   at least one network interface connected to the working packet module for receiving data from a network host and sending data to a second network host, wherein the data is related to data flows;
   a processor configured to:
      receive data from the working packet module and determine if the data flow matches a predetermined protocol wherein the predetermined protocol is one that uses a positive acknowledgment protocol; and
      if the data flow matches the predetermined protocol, using the at least one network interface to send predictive acknowledgments based on the data flow after waiting a hold-off time, the sending configured such that the predictive acknowledgement is to be received by a server after the data to which the predictive acknowledgment relates is sent by the server and before receiving data from the data flow that the predictive acknowledgment is acknowledging.

2. The network data flow management device of claim 1, wherein one or more timers are in communication with the processor to allow the processor to determine the timing of the predictive acknowledgments.

3. The network data flow management device of claim 1, wherein the predetermined protocol is one that uses a positive acknowledgment protocol.

4. The network data flow management device of claim 3, wherein the predetermined protocol is a protocol selected from:
   transmission control protocol (TCP);
   hypertext transfer protocol (HTTP);
   post Office Protocol (POP3); and
   file Transfer Protocol (FTP).

5. The network data management of claim 3, wherein the predetermined protocol is encrypted using transport layer security (TLS).

6. The network data flow management device of claim 1, where the predictive acknowledgments being sent may be based on a client equipment type.

7. The network data flow management device of claim 6, wherein the client equipment type includes a wireless handset.

8. The network data flow management device of claim 1, where the predictive acknowledgments being sent may be based on at least one client property.

9. The network data flow management device of claim 8 wherein the at least one client property is one or more of: service plan; location; network access type; browser; and operating system.

10. The network data flow management device of claim 1 wherein the network data flow management device is deployed in a flow path and the at least one network interface is adapted to receive packets from a sender and transmit packets to a receiver.

11. The network data flow management device of claim 1 wherein the network data flow management device is deployed in a client flow path and the at least one network interface is adapted to receive and transmit packets from a single client to multiple servers.

12. The network data flow management device of claim 1 wherein the network data flow management device is deployed external to the data flow and receives a copy of the data flow diverted through a network device.

13. A method for network data flow management comprising:
   monitoring a data flow between two network hosts for a predetermined protocol;
   if the data flow matches the predetermined protocol, saving data relating to the data flow; and
   creating and sending a predictive acknowledgement packet after waiting a hold-off time configured such that the predictive acknowledgment is to be received by a server after the data to which the predictive acknowledgment relates is sent by the server and before receiving data from the data flow that the predictive acknowledgment is acknowledging;
   wherein the predictive acknowledgment is transmitted by a network interface.

14. The method for data flow management of claim 13, further comprising determining whether or not to send the predictive acknowledgement packet, wherein the decision to send the predictive acknowledgment packet is based on one or more of: network congestion; history of previous data flow results; round-trip time; type and content of the data flow.

15. The method for data flow management of claim 13, further comprising determining whether or not to send the predictive acknowledgement packet, wherein the decision to send the predictive acknowledgment packet is based on at least one client property.

16. The method for data flow management of claim 15, wherein the at least one client property is based on one or more of: service plan; location; network access type; browser; operating system; and client equipment type.

17. The method for data flow management of claim 13, further comprising recovering a dropped packet between a server and a network flow management device by terminating a connection between the network flow management device and the client and establishing a new session to the server, re-sending at least one of the predictive acknowledgement packets, and recovering the dropped packet from the response on the new session.

18. The method for data flow management of claim 13, further comprising waiting for a handshake to be complete prior to creating and sending the predictive acknowledgment packet when Transport Layer Security (TLS) is used to encrypt the flow.

19. The method for data flow management of claim 13, further comprising waiting a hold-off time before sending the predictive acknowledgement packet.

20. The method for data flow management of claim 13, wherein the predetermined protocol is one that uses a positive acknowledgment protocol.

* * * * *